UNITED STATES PATENT OFFICE.

FRIEDERICKE W. KISTENMACHER, OF ST. LOUIS, MISSOURI.

PROCESS OF PREPARING GRANULATED CLEANING MATERIAL.

SPECIFICATION forming part of Letters Patent No. 440,314, dated November 11, 1890.

Application filed February 12, 1890. Serial No. 340,190. (Specimens.)

*To all whom it may concern:*

Be it known that I, FRIEDERICKE W. KISTENMACHER, of St. Louis, in the State of Missouri, have invented certain new and useful Improvements in a Process of Manufacturing Granulated Material for use in Cleaning Carpets, of which the following is a full, clear, and exact description.

My invention relates to a certain process of preparing sawdust by saturating it with a volatile solvent—such as benzine or gasoline—and it has for its object to economize the use of the said solvent by causing it only to be absorbed by the surface of the individual grains of sawdust, (in which position alone it is effective,) and I obtain this result by first washing the sawdust in water and in then partially drying it, whereby the interior of the several grains are left moist, the exterior thereof alone being dry, and in then causing the dry exterior of the sawdust to take up the volatile solvent, as will be hereinafter more fully described.

In carrying out my process I first take, say, eight pints of ordinary sawdust and thoroughly cleanse it by washing or boiling in water. Then I subject the sawdust to a short period of drying to remove a portion of the water it holds. Next I mix with this prepared sawdust one and one-third pint of benzine or a mixture consisting of one-half benzine and one-half gasoline, to which one grain of musk or other perfume-imparting substance or liquid may be added, after which the prepared sawdust may be placed in sealed bottles or packages until ready for use. In using the prepared sawdust it is strewn or scattered over the cloth or carpet (the latter of which need not be removed from the floor) to be cleaned, and it is then well brushed into the interstices of the goods by back and forth strokes of an ordinary broom or brush, the moisture contained in the sawdust preventing dust from arising, while the solvents will take up and absorb many of the impurities previously held by the fabric.

I have discovered by long continued experiment that where the benzine is applied directly to dry sawdust a much larger quantity of benzine will be required for a given volume of sawdust than would be required if the sawdust were first washed or boiled in water. By this washing, soaking, or boiling, operation the sawdust absorbs a larger percentage of water, and upon the application thereto of the benzine said benzine will not be so quickly absorbed, but will be retained upon the outer surface of the sawdust particles ready to perform its function as a solvent for dirt, grease, &c., whereas if water had not been taken up by the said sawdust a considerable greater volume of benzine would be absorbed and to no purpose. Hence by my improved method of preparing the material I effect a very large saving in the volume of benzine or other such solvent required.

If it were not for the water previously incorporated with the sawdust the benzine applied thereto would quickly volatilize and leave said sawdust in a perfectly dry state, in which state it would be obviously be unfit for use as a cleansing agent. Therefore my invention contemplates the soaking or boiling operation with two objects in view—viz., first, to wash the sawdust, and, second, to economize in the expenditure of benzine, both of which are accomplished by the simple treatment of the sawdust with water in the manner before stated.

Having thus described my invention, what I desire to claim is—

The process of preparing sawdust and a volatile solvent, which consists in first subjecting the sawdust to a washing process; second, partly drying the sawdust thus prepared, and, third, causing the sawdust to take a sufficient amount of volatile solvent, substantially as specified.

In testimony whereof I affix my signature in presence of two witnesses.

FRIEDERICKE W. KISTENMACHER.

Witnesses:
E. E. HIGDON,
JNO. C. HIGDON.